(12) United States Patent
Goto

(10) Patent No.: US 8,615,667 B2
(45) Date of Patent: Dec. 24, 2013

(54) PROCESSOR AND PROCESSOR SYSTEM

(75) Inventor: Seiji Goto, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 137 days.

(21) Appl. No.: 13/048,478

(22) Filed: Mar. 15, 2011

(65) Prior Publication Data
US 2011/0307713 A1 Dec. 15, 2011

(30) Foreign Application Priority Data
Jun. 14, 2010 (JP) ................................. 2010-135179

(51) Int. Cl.
*G06F 21/00* (2013.01)
(52) U.S. Cl.
USPC ........................................................ 713/189
(58) Field of Classification Search
None
See application file for complete search history.

(56) References Cited

U.S. PATENT DOCUMENTS

| 5,913,223 | A | * | 6/1999 | Sheppard et al. | ............. 711/118 |
| 7,181,576 | B2 | | 2/2007 | Gammel et al. | |
| 7,865,733 | B2 | | 1/2011 | Goto et al. | |
| 2005/0005071 | A1 | | 1/2005 | Gammel et al. | |
| 2006/0015748 | A1 | | 1/2006 | Goto et al. | |
| 2010/0299538 | A1 | * | 11/2010 | Miller | ........................... 713/190 |
| 2011/0119498 | A1 | * | 5/2011 | Guyot | ........................... 713/189 |

FOREIGN PATENT DOCUMENTS

| JP | 2005-512192 A | 4/2005 |
| JP | 2006-18528 A | 1/2006 |

* cited by examiner

*Primary Examiner* — Gilberto Barron, Jr.
*Assistant Examiner* — David Le
(74) *Attorney, Agent, or Firm* — Arent Fox LLP

(57) ABSTRACT

In a processor including a CPU core executing instruction codes and a cache memory part having plural ways, encryption counter data encrypting and decrypting data input/output for the core in a common key encryption system are stored at one way among the plural ways, an XOR operation is performed between the encryption counter data and the input/output data, and the common key encryption process generating the encryption counter data is not executed every time when the data is encrypted or decrypted, to thereby enable high-speed memory access without sacrificing security.

8 Claims, 10 Drawing Sheets

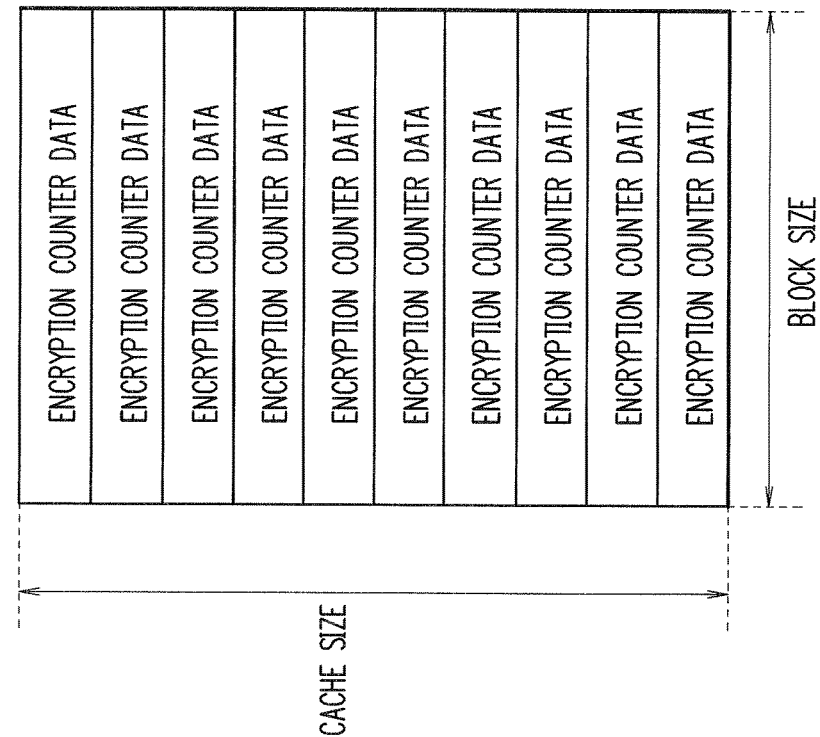
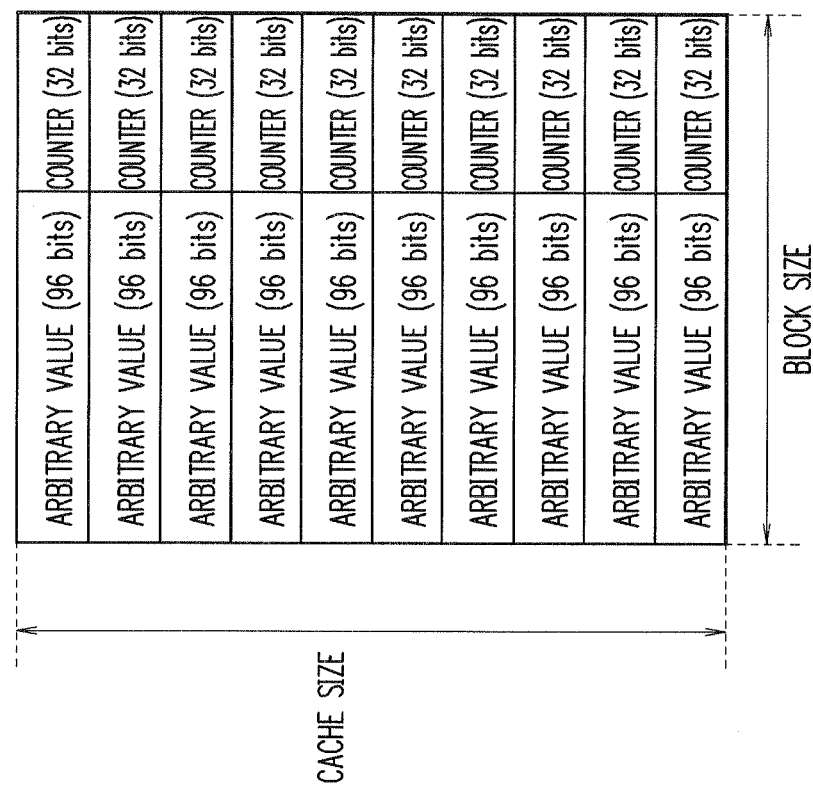
F I G. 5A
F I G. 5B

F I G. 10A
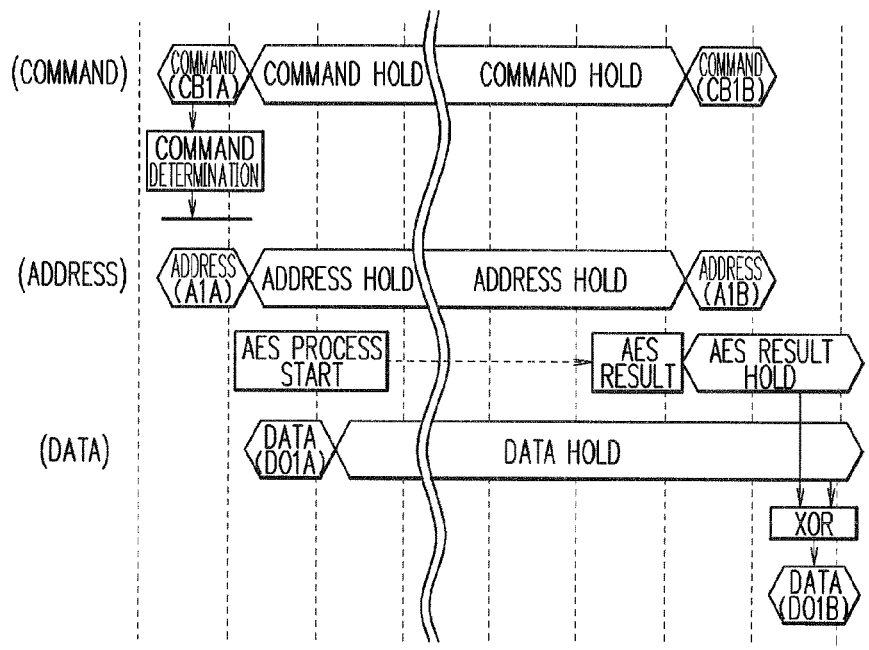
F I G. 10B
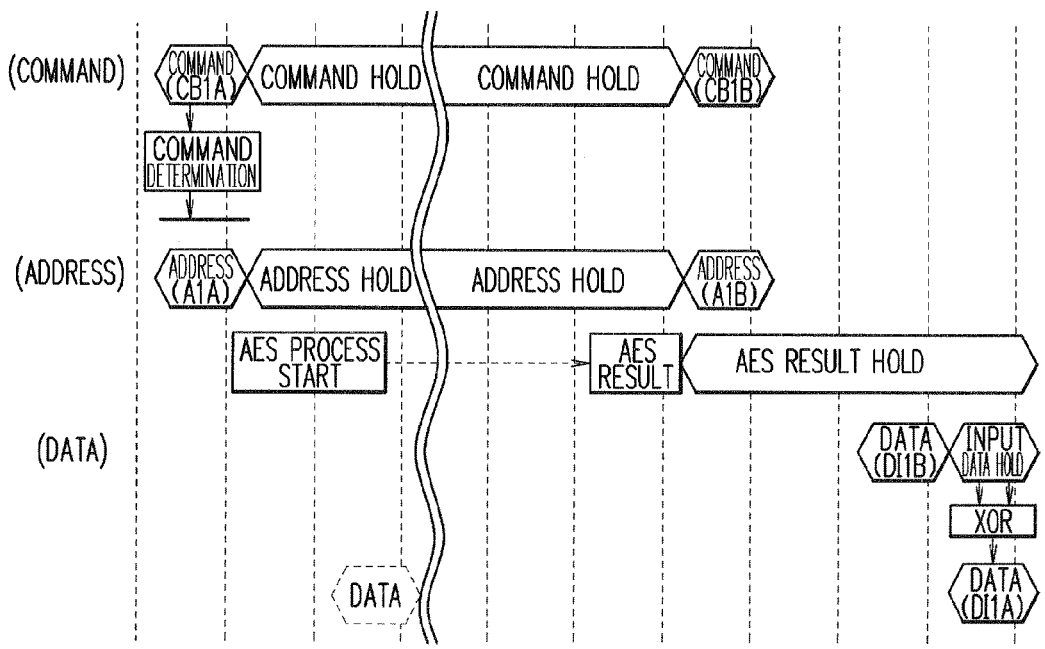

PROCESSOR AND PROCESSOR SYSTEM

CROSS-REFERENCE TO RELATED APPLICATION

This application is based upon and claims the benefit of priority of the prior Japanese Patent Application No. 2010-135179, filed on Jun. 14, 2010, the entire contents of which are incorporated herein by reference.

FIELD

The embodiments discussed herein are directed to a processor and a processor system, and to an encryption technology of data treated at the processor.

BACKGROUND

It is often the case that a processor is used for equipments such as a computer and a portable information terminal unit, because operations thereof can be controlled by programs, and various functions can be easily installed. In recent years, importance in security relating to the programs executed on the equipment has been increased as these equipments become widely used.

A large capacity memory to which execution codes of instructions and data are stored is mounted as another chip from the processor in many systems using the processor. It is not preferable that the memory storing data and so on is mounted at outside of the processor with another chip from points of views of leakage of information and analysis action. It is conceivable to encrypt a memory interface, but it involves significant increase of memory access time.

Generally, an action in which the data and so on are encrypted, and they are executed and so on after they are decrypted on a memory by a process of software is taken to solve the problems as stated above. However, the decrypted data exist on the memory even if it is for a short period of time in this method.

There is a case when a secure processor is used in which it is made impossible to directly read the data by encrypting the data treated at outside of the processor, and performing access protection as for inside of the processor, relating to the security problem. For example, the execution codes of the instructions, the data, and so on are encrypted and stored at an external main storage, secondary storage, or the like, and the process is executed by decrypting the encrypted execution codes and storing them at a cache memory inside the processor when the processor executes the instructions. The present applicants have already proposed the secure processor as stated above (refer to Patent Document 1).

Besides, a technology in which a memory field storing information indicating an encryption key used for the encryption of data stored at a data area is included, and the data at the corresponding data area encrypted and decrypted by the indicated encryption key, in a memory entry of the cache memory is proposed (for example, refer to Patent Document 2).

[Patent Document 1] Japanese Laid-open Patent Publication No. 2006-18528

[Patent Document 2] Japanese National Publication of International Patent Application No. 2005-512192

For example, according to the technology described in Patent Document 1, security in process increases because the data and so on are encrypted at outside of the processor, and the execution of the instruction and so on is possible regardless of whether the data is encrypted or not when it is seen from the processor side. However, the processing time increases because the execution codes of the instructions and the data are acquired from the external memory, and the instructions are executed while decrypting them. Besides, a circuit scale becomes very large resulting from an addition and so on of an encryption processing circuit to encrypt and decrypt the data and so on.

SUMMARY

According to an aspect of the embodiment, a processor including: a core executing instruction codes; and a cache memory part having plural ways, is Provided. The cache memory part stores encryption counter data encrypting data output from the core and decrypting data input to the core in a common key encryption system at one way among the plural ways, and includes an operation circuit performing an exclusive logical disjunction operation process of the data output from the core or the data input to the core and the stored encryption counter data.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5A and FIG. 5B are views to explain encryption counter data in the present embodiment;

FIG. 10A and FIG. 10B are timing charts to explain input/output timings of data in the system illustrated in FIG. 9.

DESCRIPTION OF EMBODIMENTS

Preferred embodiments will be explained with reference to accompanying drawings.

In the present embodiment, a common key encryption system (for example, AES (Advanced Encryption Standard) encryption system) using a common key for encryption and decryption is used as an encryption system encrypting and decrypting data and so on. As usage modes of a block encryption in the common key encryption system, an ECB (Electronic CodeBook), a CBC (Cipher Block Chaining), a CFB (Cipher FeedBack), an OFB (Output FeedBack), and a CTR (CounTeR) are known as representative modes. Among these modes, the two modes of the ECB mode and the CTR mode are available for a general memory access by the processor, namely, for random access. However, the encryption is performed by one key in the ECB mode, and therefore, encryption strength becomes relatively weak by a pattern analysis of information of which frequency of appearance is high (for example, 0x00, 0xFF, and so on) because a relationship between a not encrypted plaintext and an encrypted text is always the same. Accordingly, it is often the case that the CTR mode is used for the encryption when random access is performed.

In the embodiment described below, the encryption and the decryption of data and so on is performed by the CTR (counter) mode in the common key encryption system. In the CTR mode, a counter data depending on a data to be accessed is encrypted to generate an encryption counter data. A plaintext is encrypted to an encrypted text by performing an XOR (exclusive logical disjunction) operation between the encryption counter data and the plaintext, and the encrypted text is decrypted to the plaintext by performing the XOR operation between the encryption counter data and the encrypted text.

Figure 9:
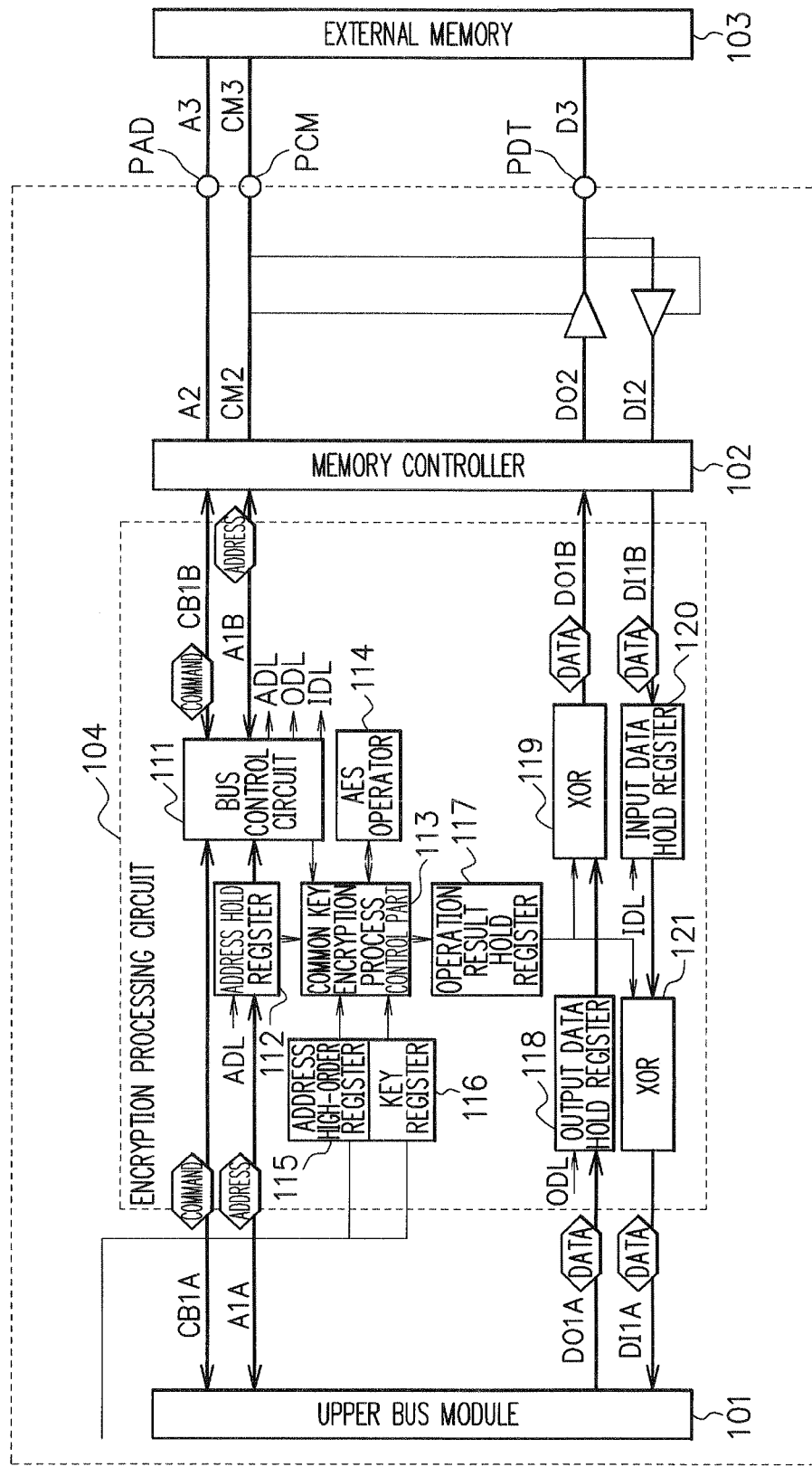
FIG. 9 is a view illustrating a implementation example of an encryption processing circuit.

FIG. 9 is a view illustrating an example of a system implementing an encryption processing circuit encrypting and decrypting data and so on in the CTR mode of the common key encryption system. In FIG. 9, a reference numeral 101 is an upper bus module such as a CPU (Central Processing Unit) and a DMA (Direct Memory Access) controller, a reference numeral 102 is a memory controller, a reference numeral 103 is an external memory, and a reference numeral 104 is an encryption processing circuit.

The upper bus module 101, the memory controller 102, and the encryption processing circuit 104 are implemented on one chip, and the external memory 103 is mounted on another chip. The upper bus module 101 and the encryption processing circuit 104 are connected by a bus control signal CB1A, an address signal A1A, an output data bus DO1A, and an input data bus DI1A. Besides, the memory controller 102 and the encryption processing circuit 104 are connected by a bus control signal CB1B, an address signal A1B, an output data bus DO1B, and an input data bus DI1B. The memory controller 102 converts a memory access request from the upper bus module 101 into a control signal for the external memory 103, and performs memory access by using an address signal A2, a memory control signal CM2, an output data bus DO2, and an input data bus DI2. The address signal A2, the memory control signal CM2, the output data bus D02, and the input data bus DI2 are connected to the external memory 103 as an address signal A3, a memory control signal CM3, and a data bus D3 via external pins PAD, PCM, PDT of the chip.

The encryption processing circuit 104 performs the encryption and the decryption in the CTR mode of the common key encryption system. The encryption processing circuit 104 has a bus control circuit 111, an address hold register 112, a common key encryption process control part 113, an encryption process operator (AES operator) 114, an address high-order register 115, a key register 116, and an operation result hold register 117. Besides, the encryption processing circuit 104 has an output data hold register 118, an XOR operation circuit 119, an input data hold register 120, and an XOR operation circuit 121.

The bus control circuit 111 controls input/output of various signals in accordance with commands and so on input by the bus control signal CB1A. Besides, the bus control circuit 111 outputs an address latch signal ADL and an input data latch signal IDL respectively at certain timings when the input command is a read command requesting read access. Besides, the bus control circuit 111 outputs the address latch signal ADL and an output data latch signal ODL respectively at certain timings when the input command is a write command requesting write access. The address hold register 112 latches and holds an address (access address) input by the address signal A1A in accordance with the address latch signal ADL.

The common key encryption process control part 113 performs a control relating to the common key encryption process (ABS process). The number of times of processes (calculation) to be regarded as an encrypted data executed by using an input and a key is defined in the common key encryption process. The common key encryption process control part 113 performs a timing control and so on relating to an operation, for example, inputting operation object data (input, key) and outputting operation results. The encryption process operator 114 executes an operation process in the common key encryption process.

The common key encryption process is executed in the CTR mode, in which an arbitrary value set at the address high-order register 115 is used for a high-order portion, a value held at the address hold register 112 is used for a low-order portion as elements of a counter data, and they are combined (coupled) to be the counter data. Besides, a value set at the key register 116 is used for an encryption key. Note that values are set in advance by software and so on at the address high-order register 115 and the key register 116. The common key encryption process is executed by using the coupled value between the value at the address high-order register 115 and the value at the address hold register 112 as the input, and the value of the key register 116 as the key, by controlling the timing and so on by the common key encryption process control part 113, and by executing the operation process at the encryption process operator 114. The operation result of the common key encryption process is stored at the operation result hold register 117.

The output data hold register 118 latches and holds a data (write data) input by the output data bus DO1A in accordance with the output data latch signal ODL. The XOR operation circuit 119 performs the XOR operation between the encryption process result held at the operation result hold register 117 and an output value of the output data hold register 118, and outputs the operation result by the output data bus DO1B as an encrypted write data.

The input data hold register 120 latches and holds a data (read data) input by the input data bus DI1B in accordance with the input data latch signal IDL. The XOR operation circuit 121 performs the XOR operation between the encryption process result held at the operation result hold register 117 and an output value of the input data hold register 120, and outputs the operation result by the input data bus DI1A as a decrypted read data.

Operations of the encryption processing circuit 104 in the write access process at the system illustrated in FIG. 9 are described with reference to FIG. 10A. FIG. 10A is a timing chart to explain the operations of the encryption processing circuit 104 in the write access process.

The write command and the access address from the upper bus module 101 are input to the encryption processing circuit 104 by the bus control signal CB1A and the address signal A1A. The write command input to the encryption processing circuit 104 is held at the bus control circuit 111, and command determination is performed to judge that the requested memory access is the write access. Besides, the access address input to the encryption processing circuit 104 is held at the address hold register 112 at a similar timing as the command, and thereafter, supplied to the common key encryption process control part 113. The common key encryption process (AES process) using the value of the supplied access address is started by the common key encryption process control part 113 and the encryption process operator 114.

Besides, the write data output at a next cycle after the write command and the access address are output from the upper bus module 101 is input to the encryption processing circuit 104 by the output data bus DO1A, and held at the output data hold register 118. The bus control circuit 111, the address hold register 112, and the output data hold register 118 maintain and hold the respectively held write command, the access address, and the write data during the execution of the common key encryption process.

When the common key encryption process by the common key encryption process control part 113 and the encryption process operator 114 is completed, the encryption process result (operation result) is held at the operation result hold register 117. Besides, the held write command and access address are output to the memory controller 102 by the bus control signal CB1B and the address signal A1B simultaneously with the completion of the common key encryption process. Subsequently, a result of the XOR operation between the held write data and the encryption process result at the XOR operation circuit 119 is output to the memory controller 102 by the output data bus DO1B as an encrypted write data.

Next, the operations of the encryption processing circuit 104 in the read access process at the system illustrated in FIG. 9 are described with reference to FIG. 10B. FIG. 10B is a timing chart to explain the operations of the encryption processing circuit 104 in the read access process.

The read command and the access address from the upper bus module 101 are input to the encryption processing circuit 104 by the bus control signal CB1A and the address signal A1A. The read command input to the encryption processing circuit 104 is held at the bus control circuit 111, and command determination is performed to judge that the requested memory access is the read access. Besides, the access address input to the encryption processing circuit 104 is held at the address hold register 112 at a similar timing as the command, and thereafter, supplied to the common key encryption process control part 113. The common key encryption process (AES process) using the value of the supplied access address is started by the common key encryption process control part 113 and the encryption process operator 114. The bus control circuit 111 and the address hold register 112 maintain and hold the respectively held read command and the access address during the common key encryption process is executed.

When the common key encryption process by the common key encryption process control part 113 and the encryption process operator 114 is completed, the encryption process result (operation result) is held at the operation result hold register 117. Besides, the held read command and access address are output to the memory controller 102 by the bus control signal CB1B and the address signal A1B simultaneously with the completion of common key encryption process.

The read data is input from the memory controller 102 to the encryption processing circuit 104 by the input data bus DI1B as a response for the read command, and it is held at the input data hold register 120. A result of the XOR operation between the read data held at the input data hold register 120 and the encryption process result performed at the XOR operation circuit 121 is input by the input data bus DI1A as a decrypted read data.

However, the common key encryption process is executed every time when the memory access occurs in the constitution as stated above, and therefore, the processing time increases drastically. For example, in the write access process, the process delays for the processing time required for the common key encryption process as illustrated in FIG. 10A, in the read access process, the process delays for the time in which one cycle time is added to the processing time required for the common key encryption process as illustrated in FIG. 10B. Besides, a circuit scale increases resulting from the encryption processing circuit relating to the execution of the common key encryption process.

In the present embodiment, an encryption processing function is enabled by using a cache memory of a processor. The encryption processing function with high security is thereby enabled without sacrificing high-speed in memory access.

Figure 1:
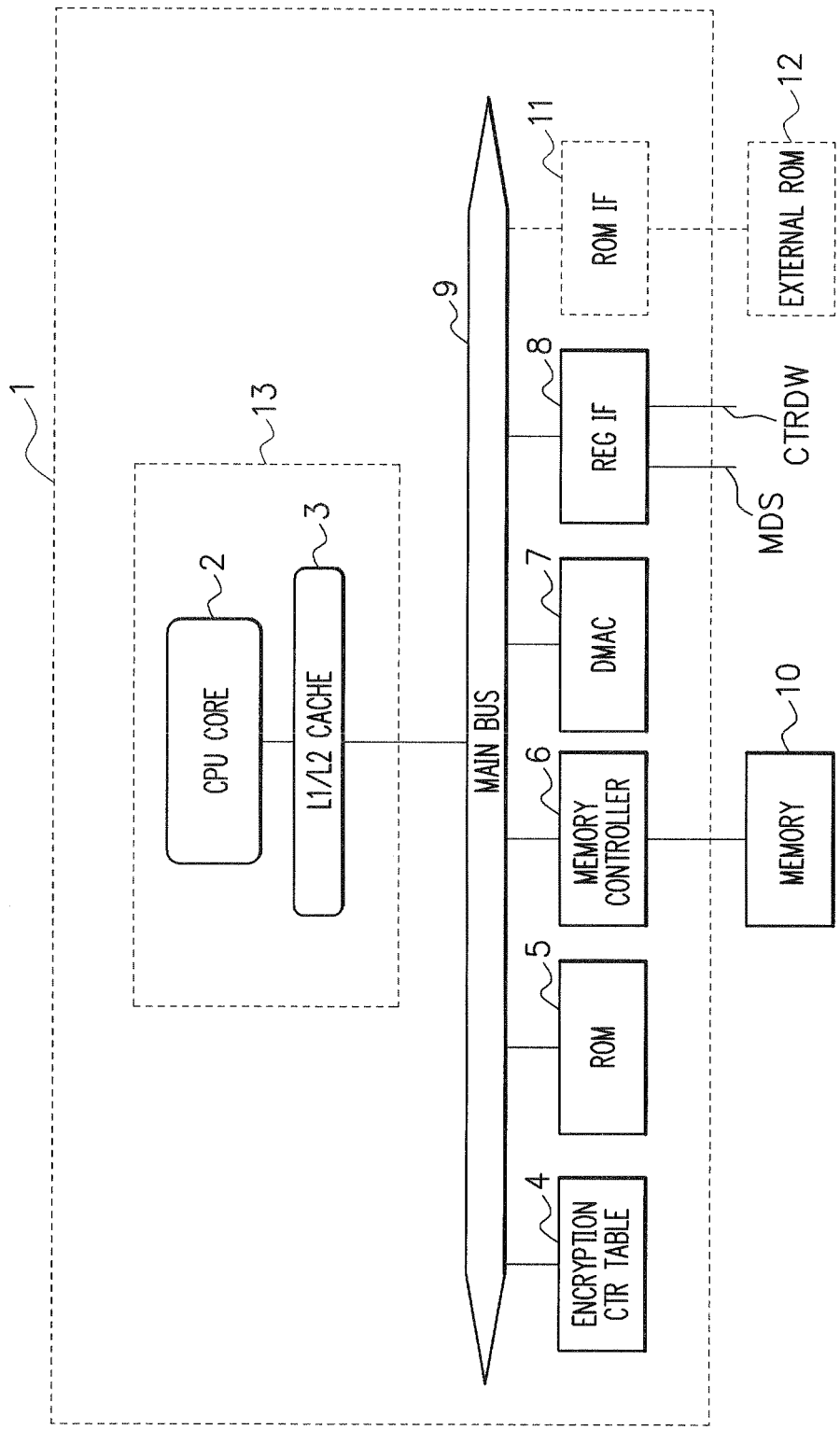
FIG. 1 is a view illustrating a configuration example of a processor system in an embodiment.

FIG. 1 is a view illustrating a configuration example of a processor system in an embodiment.

In FIG. 1, a reference numeral 1 is a processor, and respective function parts inside the processor 1 are mounted on one chip. The processor 1 has a CPU core 2, a cache memory part (primary level cache/secondary level cache) 3, an encryption CTR table 4, a ROM 5, a memory controller 6, a DMA controller 7, and a register interface 8. The cache memory part 3, the encryption CTR table 4, the ROM 5, the memory controller 6, the DMA controller 7, and the register interface 8 are communicatably connected with each other via a main bus 9. Besides, a reference numeral 10 is an external memory mounted as another chip from the processor 1. Besides, the CTR table may be stored in an external ROM 12, and a ROM interface 11 acquiring data from the external ROM 12 may be provided as described below.

Figure 2:
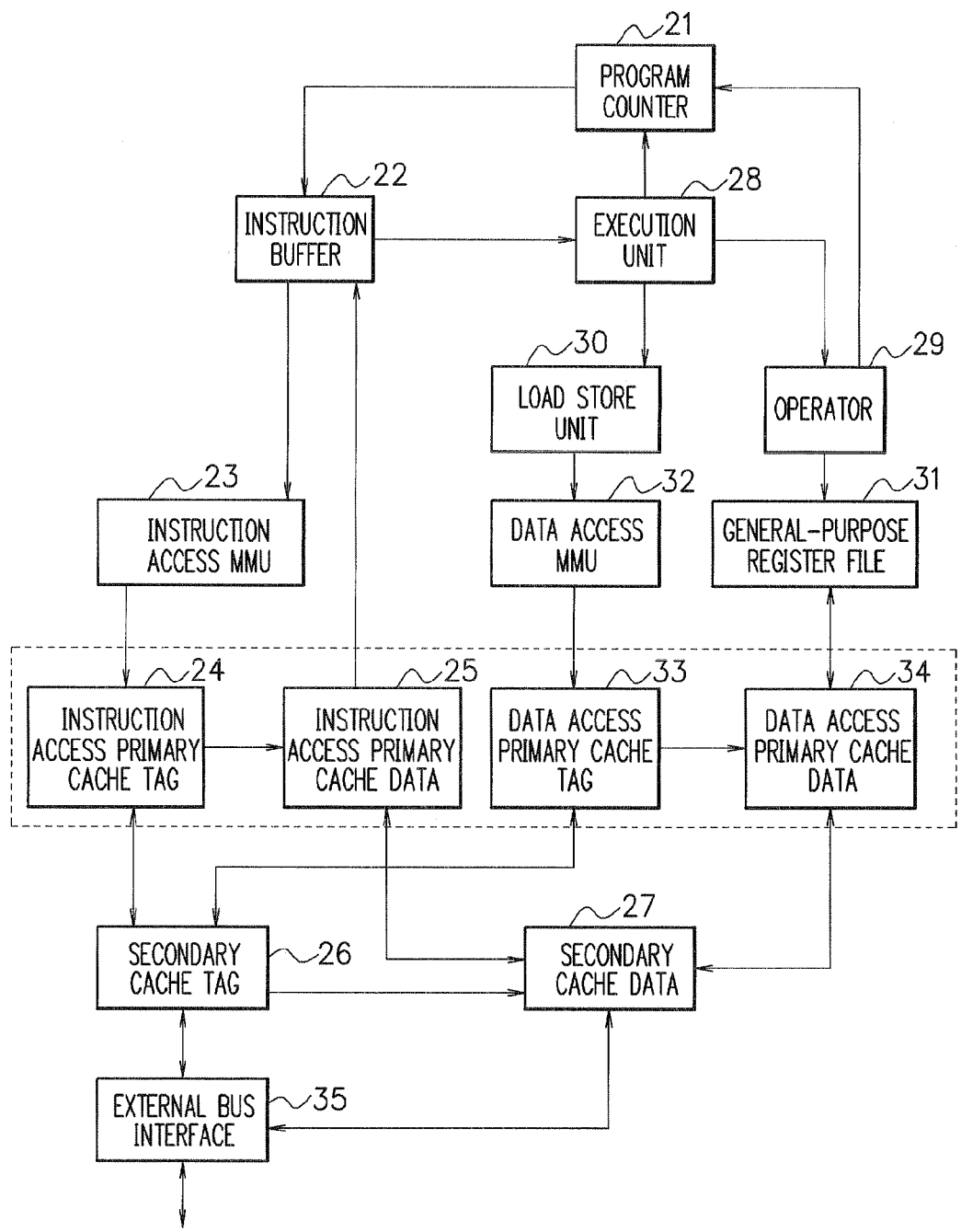
FIG. 2 is a view illustrating a configuration example of an instruction processing part illustrated in FIG. 1.

FIG. 2 is a block diagram illustrating a configuration example of an instruction processing part 13 illustrated in FIG. 1. Operations of the instruction processing part 13 illustrated in FIG. 2 are as follows.

(1) Instruction Fetch

An instruction to be executed is acquired from an external bus via an external bus interface 35. Note that the external bus described here corresponds to the main bus 9 illustrated in FIG. 1. At first, it is checked if an instruction indicated by a program counter 21 exists at an instruction buffer 22 or not. When the instruction does not exist at an instruction buffer 22, the instruction buffer 22 transmits a request to fetch the instruction to an instruction access MMU 23. The instruction access MMU 23 converts from a logical address used by the program into a physical address depending on a mapping order of hardware. An instruction access primary cache tag 24 is searched by using the address when the address matches, a read address is transmitted and the instruction data is returned to the instruction buffer 22 because it means that a corresponding data exists at an instruction access primary cache data 25. When the address does not match, the request is issued to further search a secondary cache tag 26, and an external bus when the address does not match yet. Return data are sequentially filled to a secondary cache data 27, and the instruction access primary cache data 25. At this time, the state that the return data are filled is recorded by updating the secondary cache tag 26 and the instruction access primary cache tag 24. The filled data is stored at the instruction buffer 22 as the same way as the case when the instruction data exists at the instruction access primary cache data 25.

(2) Execution of Instruction

Sequence of instruction stored at the instruction buffer 22 is transmitted to an execution unit 28, and transferred to an operator 29 or a load store unit 30 in accordance with types of respective instructions. An operation instruction and a branch instruction execute processes such that an output of the operator 29 is recorded at a general-purpose register file 31 or a program counter (not-illustrated) is updated. Besides, a load store instruction is executed at the load store unit 30 in accordance with instructions such as a load instruction performing sequential access to a data access MMU 32, a data access primary cache tag 33, a data access primary cache data 34, and copying the data to the general-purpose register file 31 as same as the instruction access, and a store instruction copying from the general-purpose register file 31 for an entry. When the data does not exist at the primary cache, the data is acquired from the secondary cache in common with an instruction execution mechanism, or from the external bus, and it is executed similarly. After the execution is completed, the program counter is sequentially added, or updated to a branch instruction address, and the instruction fetch of (1) is executed again.

(3) Total

Figure 3:
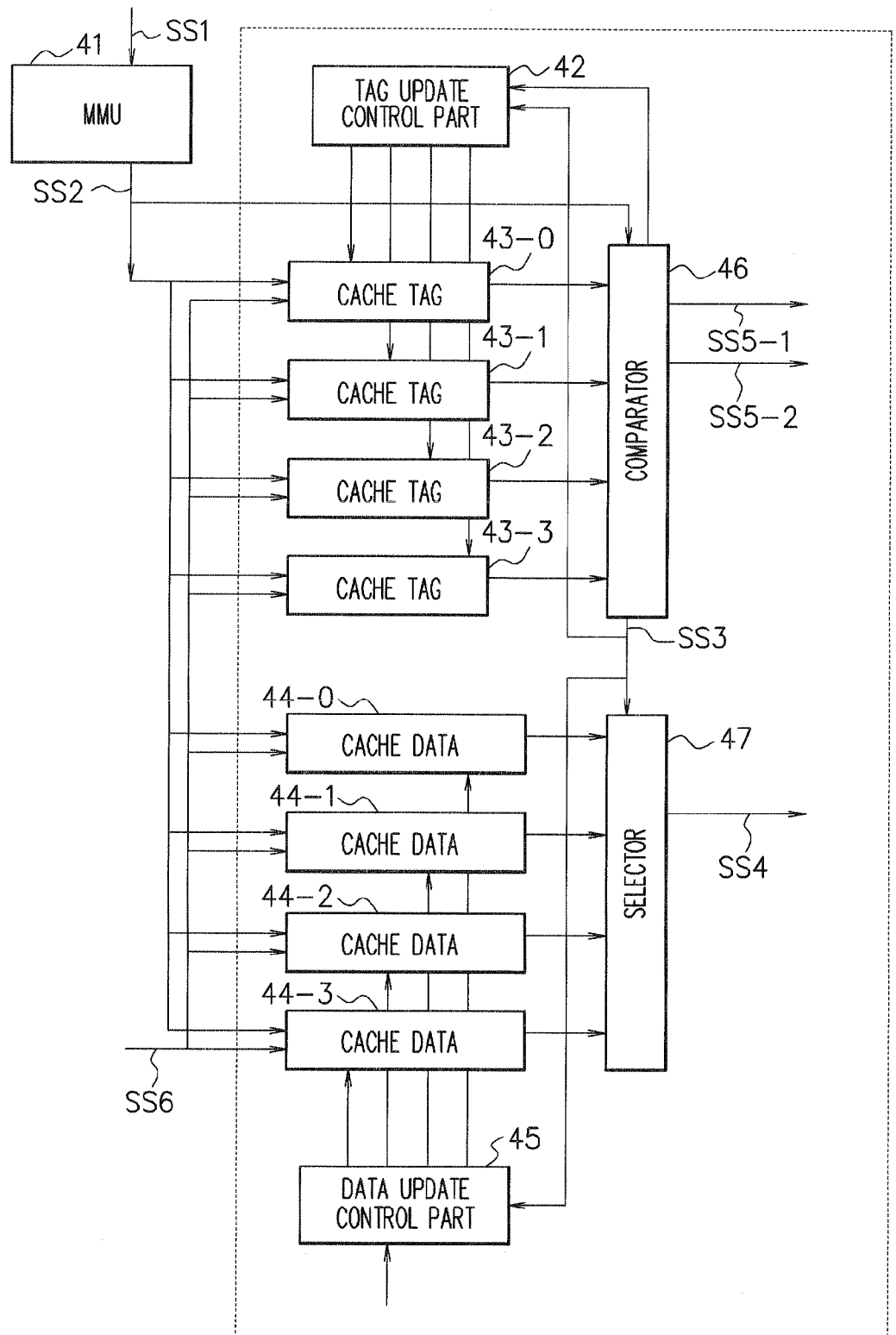
FIG. 3 is a view illustrating a configuration example of a cache memory part illustrated in FIG. 1.

A microprocessor operates by repeating the instruction fetch, the instruction execution as stated above. FIG. 3 is a configuration chart of a data access mechanism of a 4-way set associative cache memory. Note that the configuration illustrated in FIG. 3 corresponds to, for example, a set of the instruction access primary cache tag 24 and the instruction access primary cache data 25, or a set of the data access primary cache tag 33 and the data access primary cache data 34 illustrated in FIG. 2.

An access request/address (instruction fetch/load store) SS1 is transmitted to an MMU 41, converted into a physical address SS2, and thereafter, transmitted to cache tags 43-0, 43-1, 43-2, 43-3 and cache data 44-0, 44-1, 44-2, 44-3 as an address. Here, for example, the cache tag 43-0 and the cache data 44-0 correspond to a way 0, the cache tag 43-1 and the cache data 44-1 correspond to a way 1. Similarly, the cache tag 43-2 and the cache data 44-2 correspond to a way 2, and the cache tag 43-3 and the cache data 44-3 correspond to a way 3.

When an address high-order bit (tag) indicated by a tag output matches with a request address from the MMU 41 among the tag outputs searched by the same low-order address (index), it means that there is an effective data in the cache data 44-0 to 44-3 (cache hit). These matching detections are performed at a comparator 46, and at the same time, a selector 47 is started by hit information SS3. When there is a cache hit, the data is transmitted to an instruction buffer and so on as an instruction data SS4 or the like. When there is not a cache hit, a cache miss request SS5-1, a cache miss address SS5-2 are output to a secondary cache. After that, a return data from the secondary cache updates the cache tags 43-0 to 43-3 and the cache data 44-0 to 44-3, and similarly returns the data to the instruction buffer and so on. When the cache tags 43-0 to 43-3 and the cache data 44-0 to 44-3 are updated, a write address SS6 is output from the MMU 41. The updates of the cache tags 43-0 to 43-3 and the cache data 44-0 to 44-3 are performed by a tag update control part 42 and a data update control part 45. In case of an N-way constitution, inputs to the comparator 46 and the selector 47 become "N".

Figure 4A:
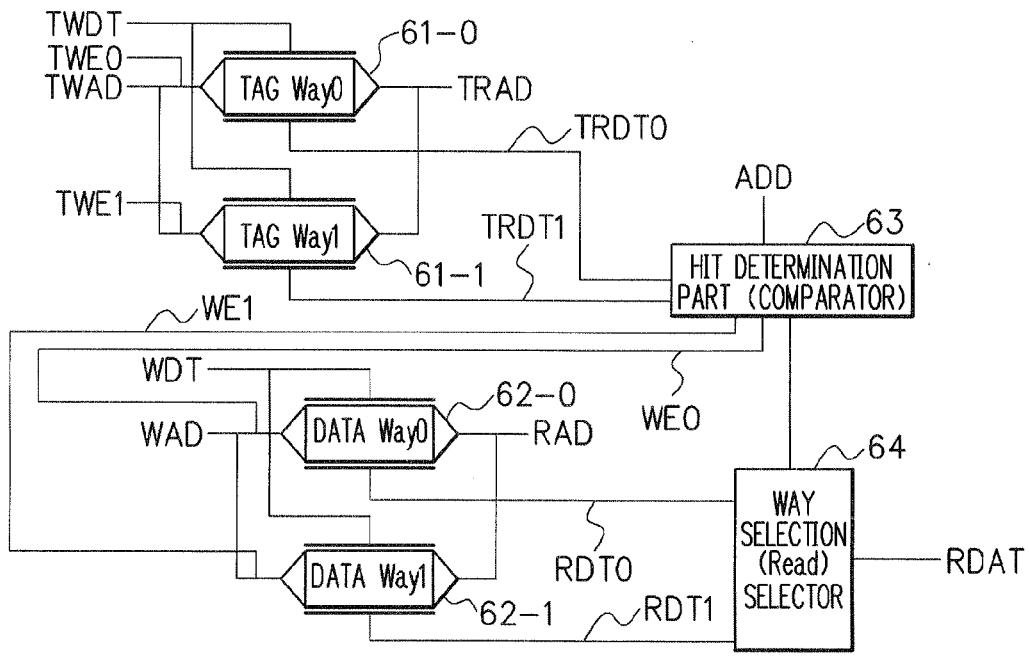
FIG. 4A and FIG. 4B are views illustrating configuration examples of the cache memory parts in the present embodiment.
Figure 4B:
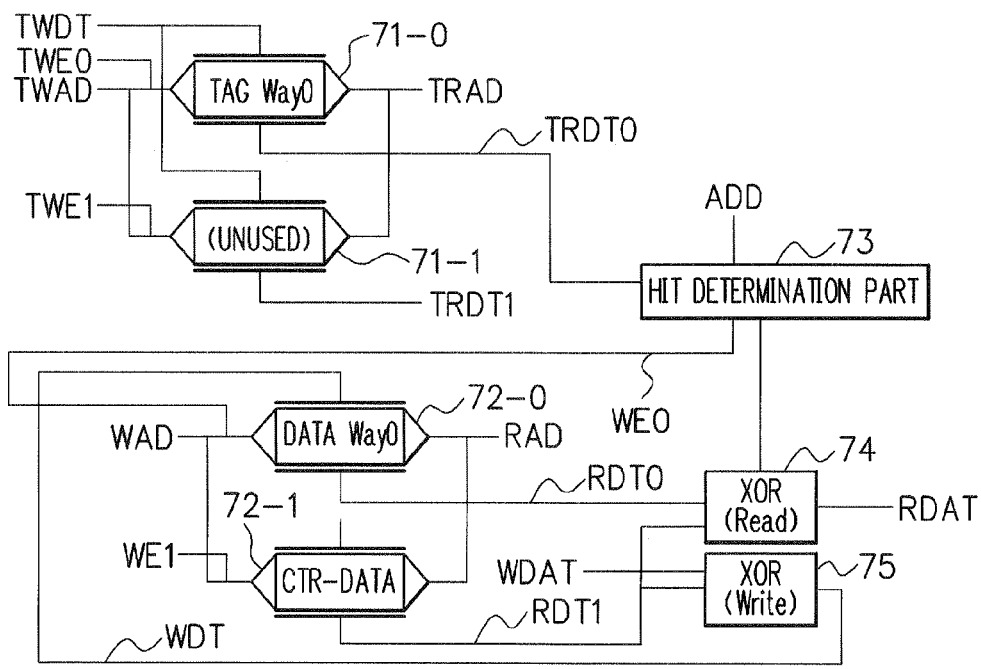

FIG. 4A and FIG. 4B are views illustrating configuration examples of cache memory parts in the embodiment. Note that in the following description, a 2-way set associative cache memory is exemplified to be described as an example to simplify the explanation.

FIG. 4A is a view illustrating the configuration example of the 2-way set associative cache memory. In FIG. 4A, a reference numeral 61-0 is a cache tag memory of a way 0, and a reference numeral 61-1 is a cache tag memory of a way 1. A reference numeral 62-0 is a cache data memory of the way 0, and a reference numeral 62-1 is a cache data memory of the way 1. Besides, a reference numeral 63 is a hit determination part corresponding to the comparator illustrated in FIG. 3, and a reference numeral 64 is a way selection selector corresponding to the selector 47 illustrated in FIG. 3.

As illustrated in FIG. 4A, a low-order address (index) TWAD and a high-order address (tag) TWDT in an access address are supplied to the cache tag memories 61-0, 61-1. Besides, a low-order address (index) WAD in the access address and a write data WDT are supplied to the cache data memories 62-0, 62-1. The high-order address (tag) in the access address and the write data are written to the cache tag memory 61-0 and the cache data memory 62-0 of the way 0, or the cache tag memory 61-1 and the cache data memory 62-1 of the way 1 in accordance with the low-order address (index) in the access address.

Besides, a low-order address (index) TRAD in the access address is supplied to the cache tag memories 61-0, 61-1 at a read access time, and tag outputs searched by the above are output as tag read data TRDT0, TRDT1. Similarly, a low-order address (index) RAD in the access address is supplied to the cache data memories 62-0, 62-1 at the read access time, and data outputs searched by the above are output as read data RDT0, RDT1. Here, the tag read data TRDT0, TRDT1 output from the cache tag memories 61-0, 61-1 are the high-order addresses (tags) in the access address searched in accordance with the indexes. The hit determination part 63 compares values output as the tag read data TRDT0, TRDT1 and parts corresponding to the tags in an access address ADD. The read data RDT0, RDT1 are selected by the way selection selector 64 in accordance with a comparison result at the hit determination part 63, and they are output to the CPU core 2 as the read data RDAT.

In the present embodiment, the encryption processing function is enabled by storing the encryption counter data (CTR-DATA) used in the CTR mode of the common key encryption system at a cache data memory of one way as illustrated in FIG. 4B. An example illustrated in FIG. 4B illustrates a case when the way 1 is used to store the encryption counter data. In FIG. 4B, reference numerals 71-0, 71-1 are cache tag memories, and they correspond to the cache tag memories 61-0, 61-1 illustrated in FIG. 4A. Besides, reference numerals 72-0, 72-1 are cache data memories, and they correspond to the cache data memories 62-0, 62-1 illustrated in FIG. 4A. Incidentally, the cache tag memory 71-1 corresponding to the way 1 is not used in the present embodiment, and the encryption counter data (CTR-DATA) are stored at the cache data memory 72-1 corresponding to the way 1. A reference numeral 73 is a hit determination part, and reference numerals 74, 75 are XOR operation circuits.

The low-order address (index) TWAD and the high-order address (tag) TWDT in the access address are supplied to the cache tag memory 71-0 at the write access time. Similarly, the low-order address (index) WAD in the access address is supplied to the cache data memories 72-0, 72-1. The encryption counter data in accordance with the low-order address (index) in the access address is thereby output from the cache data memory 72-1 to the XOR operation circuit 75 as the read data RDT1. The XOR operation circuit 75 performs the XOR operation between the encryption counter data output from the cache data memory 72-1 and the write data WDAT, and outputs the operation result to the cache data memory 72-0 as the write data WDT. Here, the write data WDT supplied from the XOR operation circuit 75 to the cache data memory 72-0 is an encrypted text data in which the write data WDAT in plaintext is encrypted by the encryption counter data. The high-order address (tag) in the access address and the encrypted write data are written to the cache tag memory 71-0 and the cache data memory 72-0 of the way 0 in accordance with the low-order address (index) in the access address.

Besides, the low-order address (index) TRAD in the access address is supplied to the cache tag memory 71-0 at the read access time, and the tag output searched by the above is output as the tag read data TRDT0. Similarly, the low-order address (index) RAD in the access address is supplied to the cache data memories 72-0, 72-1. The searched data outputs are thereby output as the read data RDT0, RDT1. Here, the read data RDT1 output from the cache data memory 72-1 is the encrypted counter data in accordance with the index. Besides, the tag read data TRDT0 output from the cache tag memory 71-0 is the high-order address (tag) in the access address searched in accordance with the index. The hit determination part 73 compares a value output as the tag read data TRDT0 and a part corresponding to the tag in the access address ADD. As a result, when they are matched, a result of the XOR operation between the read data and the encryption counter data respectively output from the cache data memories 72-0, 72-1 performed by the XOR operation circuit 74 is output to the CPU core 2 as the read data RDAT. Here, the read data RDT output from the XOR operation circuit 74 is a decrypted data in which the read data RDT0 in the encrypted text is decrypted by the encryption counter data.

FIG. 5A and FIG. 5B are views illustrating an example of the encryption counter data stored in the cache data memory. An example of the encryption counter data in a system having an address of 32 bit wide is illustrated in FIG. 5A and FIG. 5B. In the common key encryption system, a data is encrypted or decrypted by every certain block size, and it is encrypted or decrypted by every 128 bits here.

As illustrated in FIG. 5A, a data in accordance with an address (index) value for a cache size (the number of entries in one way) is set. In an example illustrated in FIG. 5A, high-order 96 bits are set as an arbitrary value, and low-order 32 bits are set as a counter value in accordance with an address value. The data illustrated in FIG. 5A is set as a counter data, it is encrypted by using an encryption key, and thereby, an encryption counter data having a block size as illustrated in FIG. 5B is acquired, and it is stored in the cache data memory. Accordingly, the encryption counter data stored at the cache data memory is a data depending on the low-order bit (index) in the access address, and it is possible to encrypt or decrypt in the CTR mode of the common key encryption system.

Note that in the above-stated description, the encryption counter data is generated by encrypting the counter data using the arbitrary value for the high-order bits and the address value for the low-order bits, but it is not limited to the above. The encryption counter data may be uniquely determined in accordance with the address, and the counter data is arbitrary.

Figure 6A:
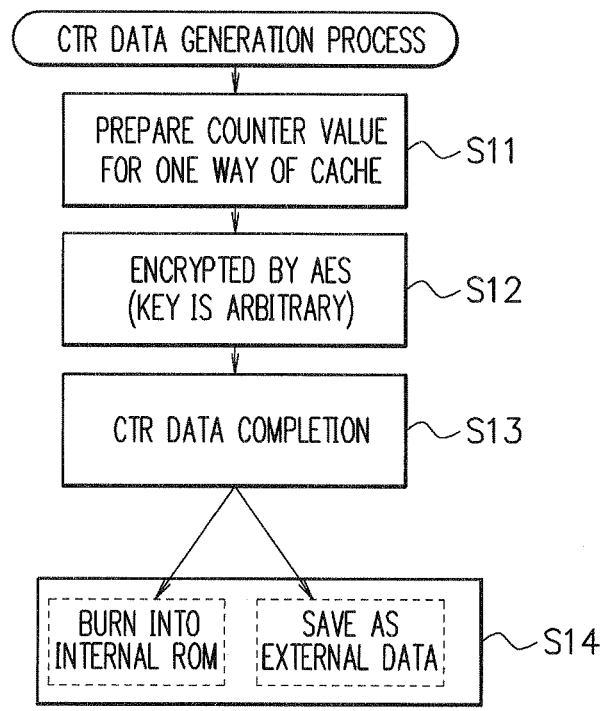
FIG. 6A is a flowchart illustrates an example of a generation process of the encryption counter data in the present embodiment.
Figure 6B:
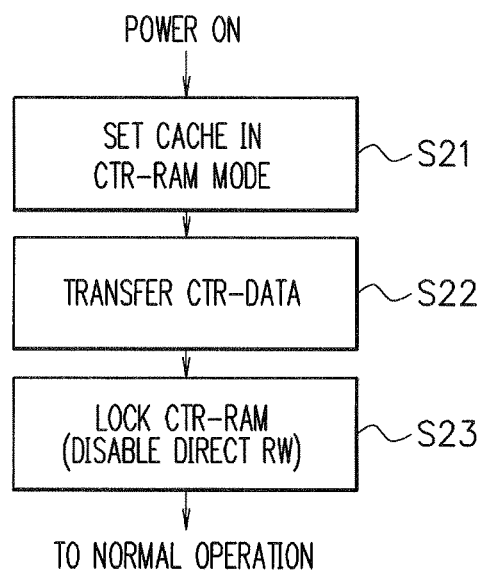
FIG. 6B is a flowchart illustrating an example of a set up process of the encryption counter data in the present embodiment.

The encryption counter data may be stored in the cache data memory in accordance with a process flow illustrated in FIG. 6A and FIG. 6B.

FIG. 6A is a flowchart illustrating an example of a generation process of the encrypted counter data, and this process is executed in advance by a software process and so on using a computer.

At first, in the generation process, the counter data for one way of a cache, namely, in a cache size (the number of entries) is prepared (step S11). Next, the counter data is encrypted by a key (arbitrary) in the common key encryption system (step S12). The encryption counter data for the cache size is thereby completed (step S13). The completed encryption counter data is burned into an internal ROM or stored as an external data at an external ROM and so on (step S14) so as to be able to be applied to the cache data memory at the system operation time.

FIG. 6B is a flowchart illustrating an example of a set up process setting the encryption counter data to the cache memory when the encryption processing function using the cache memory is enabled. A program executing the process illustrated in FIG. 6B is written to, for example, a ROM inside a processor chip, and executed by the CPU and so on after a reset release.

Power supply is started to the system (power on), and the cache memory is set to a CTR-RAM mode when it is set such that the encryption processing function is enabled by using the cache memory (step S21). Here, the CTR-RAM mode is an operation mode when the encryption processing function is enabled by using the cache memory, and it is a mode in which one way in the cache memory is used to store the encryption counter data. Next, the encryption counter data is transferred from the encryption CTR table 4, the ROM 5, or the external ROM 12 to the cache memory (cache data memory) (step S22). After that, the cache memory to which the encryption counter data are stored is locked so that the values of the cache memory are not to be rewritten (step S23). Note that a method to lock the cache memory is an arbitrary. For example, a write enable signal WE of the cache memory to which the encryption counter data are stored may be masked, or the cache memory may be managed so as not to be the oldest one.

Figure 7A:
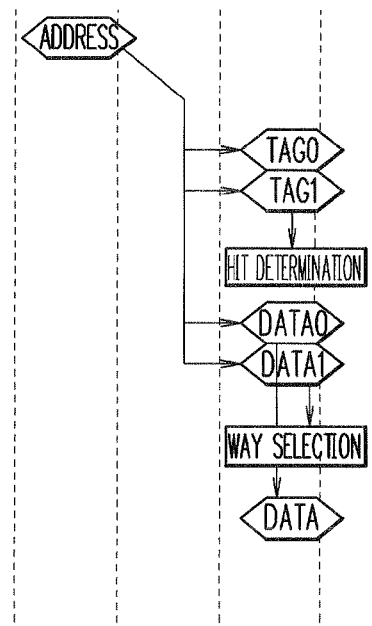
FIG. 7A to FIG. 7D are timing charts to explain input/output timings of data in the present embodiment.
Figure 7B:
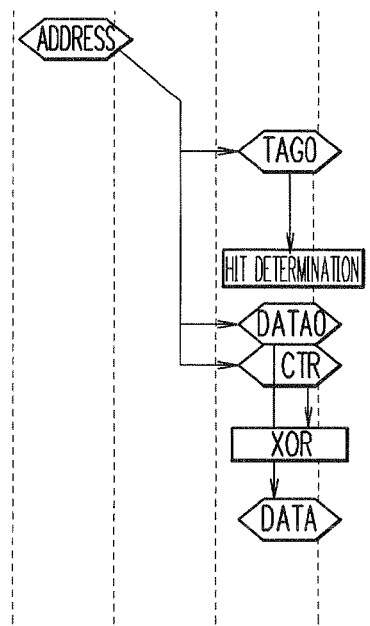
Figure 7C:
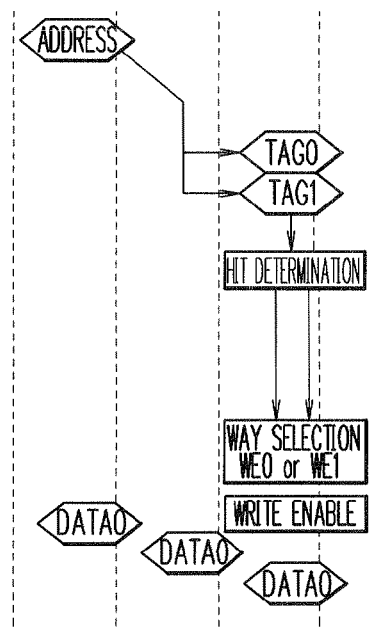
Figure 7D:
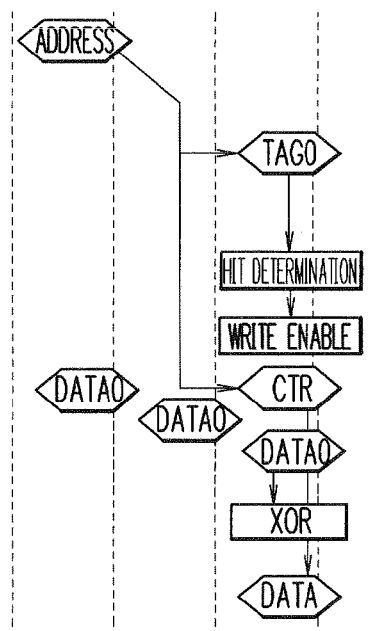

According to the present embodiment, the encryption counter data which are already encryption processed are stored in the cache memory to perform the encryption or the decryption of data and so on, and thereby, it is not necessary to execute the common key encryption process (calculation of the encryption counter data and so on) each time. Besides, the number of logical steps (the number of cycles required for the process) of the XOR operation circuit provided to enable the encryption function is almost the same as that of a selector for a way selection included by a conventional cache memory. Accordingly, it is possible to process at a timing similar to an access when it is not encrypted as illustrated in FIG. 7A to FIG. 7D, and a delay time does not increase. As stated above, it is possible to enable high-speed memory access while maintaining security in the processor system of the present embodiment. FIG. 7A and FIG. 7C illustrate a data input/output timing at a normal operation time in the present embodiment, and FIG. 7B and FIG. 7D illustrate a data input/output timing at an encryption processing execution time in the present embodiment. Note that FIG. 7A and FIG. 7B represent the read access times, and FIG. 7C and FIG. 7D represent the write access times.

Figure 8:
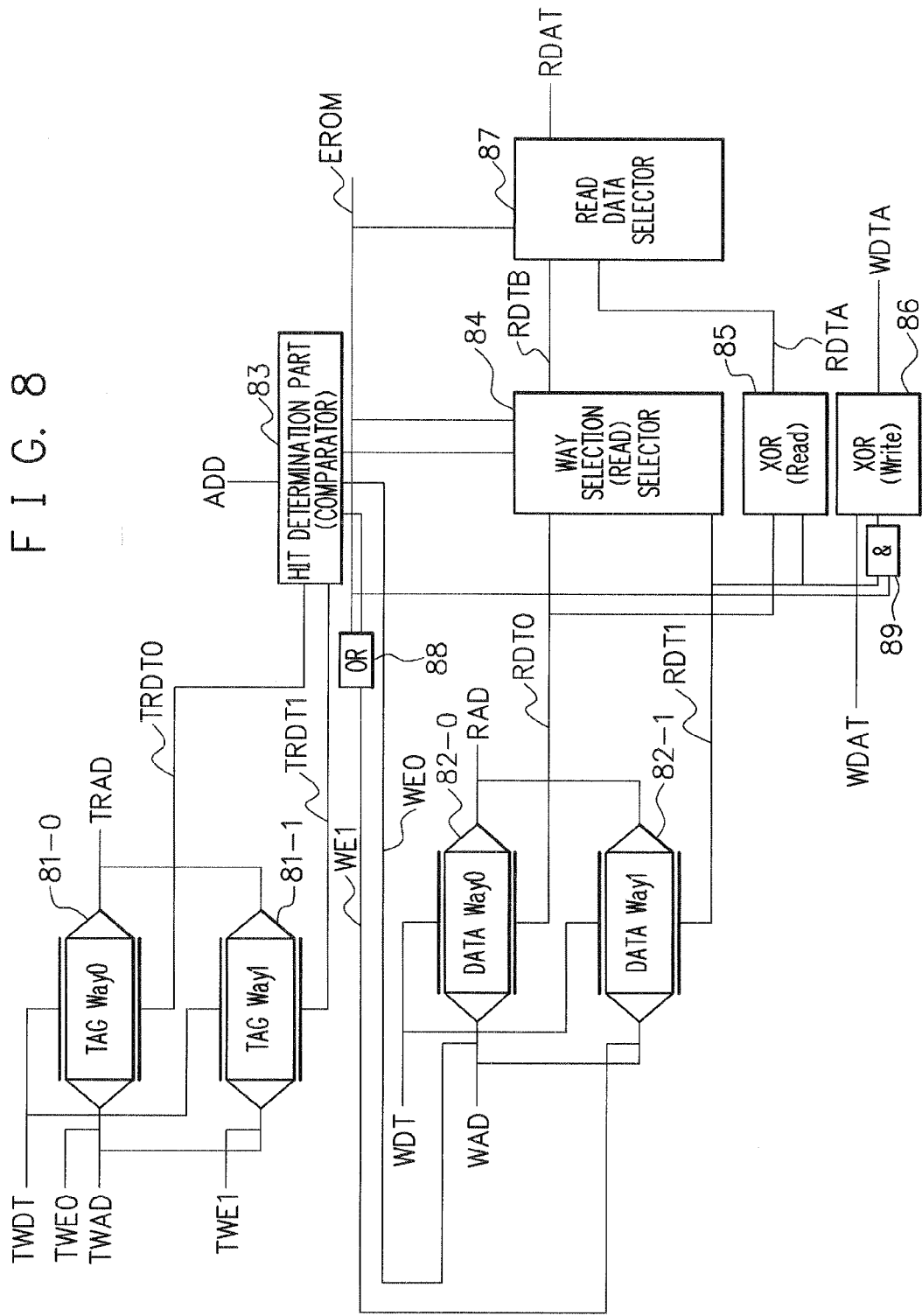
FIG. 8 is a view illustrating another configuration example of the cache memory part in the present embodiment.

Note that as illustrated in FIG. 8, the cache memory may be set to be switchable whether it is used as a normal cache memory or used to enable the encryption processing function in accordance with a set signal EROM from external. Note that the same reference numerals and symbols are used in FIG. 8 for the same components and so on as the components and so on illustrated in FIG. 4.

In FIG. 8, reference numerals 81-0, 81-1 are cache tag memories of way 0, way 1, and reference numerals 82-0, 82-1 are cache data memories of the way 0, way 1. A reference numeral 83 is a hit determination unit, a reference numeral 84 is a way selection selector at a read access time, and reference numerals 85, 86 are XOR operation circuits. Besides, a reference numeral 87 is a selector to select an output of the way selection selector 84 or an output of the XOR operation circuit 85, and a reference numeral 88 is an OR (logical disjunction) operation circuit, and a reference numeral 89 is an AND (logical product) operation circuit.

As illustrated in FIG. 8, when the set signal EROM is true (the encryption processing function is turned on), a write enable signal WE1 of the cache data memory 82-1 is masked by the OR operation circuit 88. Besides, the encryption counter data from the cache data memory 82-1 is set to be supplied to the XOR operation circuit 86 by the AND operation circuit 89. Besides, the selector 87 controls such that the output of the XOR operation circuit 85 is to be output as the read data RDAT.

On the other hand, when the set signal EROM is false (the encryption processing function is turned off), the write enable signal WE1 of the cache data memory 82-1 is unmasked by the OR operation circuit 88. Besides, the encryption counter data from the cache data memory 82-1 is masked by the AND operation circuit 89. The selector 87 controls such that the output of the way selection selector 84 is to be output as the read data RDAT. It becomes possible to use the cache memory also as the normal cache memory in accordance with the set signal EROM by constituting as stated above.

Note that in the above-stated description, the 2-way set associative cache memory is exemplified to be described for simplification of the explanation, but the present embodiment is applicable for a multi-way set associative cache memory having plural ways. It is also possible to enable the encryption processing function of the present embodiment by using one way for storing the encryption counter data, and the other ways as same as a normal state in case of the N-way set associative cache memory.

Besides, the encryption counter data is not limited to one, and plural kinds of encryption counter data may be included to be switched appropriately. For example, the plural kinds of encryption counter data are recorded to the encryption CTR table illustrated in FIG. 1 as a table, and the encryption counter table to be stored at the cache memory may be switched in accordance with a setting and so on from external. It is thereby possible to suppress that the encryption strength is lowered.

According to the disclosed processor, the encryption of the data output from the core and the decryption of the data input to the core is performed while storing the encryption counter data to which the encryption processing is already executed at the cache memory part. Accordingly, it is not necessary to execute the common key encryption process generating the encryption counter data every time when the encryption or the decryption is performed, and it is possible to enable the high-speed memory access without sacrificing the security.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A processor, comprising:
a core configured to execute instruction codes; and
a cache memory part including a plurality of ways and configured to store output data from the core and input data to the core,
wherein the cache memory part is configured to store encrypted counter data in one way among the plurality of ways, the output data being encrypted with the encrypted counter data in a common key encryption system, the input data being decrypted with the encrypted counter data in the common key encryption system,
wherein the cache memory part includes an operation circuit configured to perform an exclusive logical disjunction operation process between the encrypted counter data and at least one of the output data and the input data, and
wherein a first operation mode and a second operation mode are switched in accordance with a setting, the encrypted counter data being stored in the one way of the cache memory part during the first operation mode, the one way being used as a cache configured to store the output data and the input data during the second operation mode.

2. The processor according to claim 1, further comprising:
a storage part configured to store the encrypted counter data prepared in advance.

3. The processor according to claim 2,
wherein the storage part is configured to store a plurality of tables each including a group of encrypted counter data.

4. The processor according to claim 1,
wherein the encrypted counter data comprises a data value in accordance with a value of an index at the cache memory part.

5. The processor according to claim 1,
wherein the output data is encrypted and the input data is decrypted in a CTR mode of an AES encryption system.

6. A processor system, comprising:
a processor including a core configured to execute instruction codes, and a cache memory part including a plurality of ways and configured to store output data from the core and input data to the core; and
a memory mounted as another chip from the processor, and configured to store the output data and the input data,
wherein the cache memory part is configured to store encrypted counter data in one way among the plurality of ways, the output data being encrypted with the encrypted counter data in a common key encryption system, the input data being decrypted with the encrypted counter data in the common key encryption system,
wherein the cache memory part includes an operation circuit configured to perform an exclusive logical disjunction operation process between the encrypted counter data and at least one of the output data and the input data, and
wherein a first operation mode and a second operation mode are switched in accordance with a setting, the encrypted counter data being stored in the one way of the cache memory part during the first operation mode, the one way being used as a cache configured to store the output data and the input data during the second operation mode.

7. The processor system according to claim 6, further comprising:
a storage part configured to store the encrypted counter data prepared in advance.

8. The processor system according to claim 7,
wherein the storage part is provided at outside of the processor.

* * * * *